United States Patent
Poddutur et al.

(10) Patent No.: US 9,053,273 B2
(45) Date of Patent: Jun. 9, 2015

(54) IC DELAYING FLIP-FLOP OUTPUT PARTIAL CLOCK CYCLE FOR EQUALIZING CURRENT

(75) Inventors: Sumanth Reddy Poddutur, Bangalore (IN); Prakash Narayanan, Bangalore (IN); Vivek Singhal, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/554,762

(22) Filed: Jul. 20, 2012

(65) Prior Publication Data

US 2014/0021993 A1    Jan. 23, 2014

(51) Int. Cl.
*H03K 5/00* (2006.01)
*G06F 17/50* (2006.01)
*H03K 3/013* (2006.01)

(52) U.S. Cl.
CPC ............ *G06F 17/5054* (2013.01); *H03K 3/013* (2013.01); *G06F 2217/82* (2013.01)

(58) Field of Classification Search
USPC ............................................. 327/34, 551–559
See application file for complete search history.

(56) References Cited

U.S. PATENT DOCUMENTS

| | | | |
|---|---|---|---|
| 6,560,147 B2 * | 5/2003 | Yoshiyama | 365/189.05 |
| 6,714,612 B1 * | 3/2004 | Chaudry | 375/368 |
| 6,799,280 B1 * | 9/2004 | Edenfield et al. | 713/400 |
| 8,829,953 B1 * | 9/2014 | Ali et al. | 327/115 |

* cited by examiner

*Primary Examiner* — Dinh Le
(74) *Attorney, Agent, or Firm* — Lawrence J. Bassuk; Frank D. Cimino

(57) ABSTRACT

Apparatuses and methods for suppressing power supply noise harmonics are disclosed. A method includes selecting at least one flip-flop of a plurality of data paths of an integrated circuit based on a slack associated with the at least one flip-flop. The method also includes providing at least one delay circuit at an output of at least one flip-flop. The at least one delay circuit is configured to delay the output of the at least one flip-flop by a threshold clock cycle for managing current at a positive edge of a clock input and current at a negative edge of the clock input, thereby suppressing power supply noise harmonics of the integrated circuit.

7 Claims, 5 Drawing Sheets

US 9,053,273 B2

IC DELAYING FLIP-FLOP OUTPUT PARTIAL CLOCK CYCLE FOR EQUALIZING CURRENT

TECHNICAL FIELD

Various implementations of the present disclosure generally relate to managing power supply noise harmonics in integrated circuits.

BACKGROUND

In mixed signal Integrated Circuits (ICs), such as System on Chip (SOC) circuits, several components are integrated in a single chip. Mixed-signal ICs are chips that include both digital and analog circuits on the same chip. This category of chip has grown significantly with the increasing usage of third generation (3G) and fourth generation (4G) cell phones and other portable technologies. For example, a single chip may be designed with different radio subsystems, including Global Positioning Systems (GPSs), Bluetooth systems, Wireless Local Area Network (LAN) systems, and Frequency Modulation (FM) radio systems.

SUMMARY

Methods of designing integrated circuits are provided, where the integrated circuits are capable of suppressing power supply noise harmonics. In certain embodiments, the methods include selecting flip-flops in data paths of the integrated circuit based on slacks associated with the flip-flops. The methods may also include providing delay circuits at flip-flop outputs to delay each corresponding output by a threshold clock cycle and equalize current at a positive edge of a clock input and current at a negative edge of the clock input, thereby suppressing power supply noise harmonics of the integrated circuit.

Integrated circuits capable of suppressing power supply noise harmonics are also provided. In certain embodiments, an integrated circuit includes data paths with multiple flip-flops. In some embodiments, the integrated circuit may also include delay circuits at flip-flop outputs to delay each corresponding output by a threshold clock cycle and equalize current at a positive edge of a clock input and current at a negative edge of the clock input, thereby suppressing power supply noise harmonics in the integrated circuit. In some embodiments, the threshold clock cycle is a half clock cycle. In some embodiments, the integrated circuit also includes a control circuit connected to each delay circuit for enabling and disabling a corresponding delay circuit.

DETAILED DESCRIPTION

Pursuant to exemplary scenarios, some ICs include multiple radio components on a single chip. Unfortunately, while the ability to incorporate multiple radio components on a single chip enables smaller devices with greater functionality, doing so can also be the source of certain limitations. For example, in mixed signal ICs, toggling a digital circuit corresponding to a given component causes power supply harmonic noise (and ground signal noise) that interferes with analog circuits of other components. Such noise can result in significant performance degradation of such mixed signal and other ICs.

In a more particular example, an IC referred to as the NL5500 of Texas Instruments®includes circuits for Bluetooth, Wireless LAN, FM radio and GPS. The FM radio circuit operates at frequencies of 66-108 MHz, and the GPS circuit operates at a frequency of 32 MHz. However, due to periodic switching of digital circuits associated with the GPS at 32 MHz, a third harmonic is induced through the power supply and/or ground network. The third harmonic can center around 96 MHz, which lies in the range of the operating frequency (66-108 MHz) of the FM radio circuit. Accordingly, this third harmonic can destructively interfere with analog circuits associated with the FM radio circuit, and may result in de-sense for the FM radio.

Figure 1A:
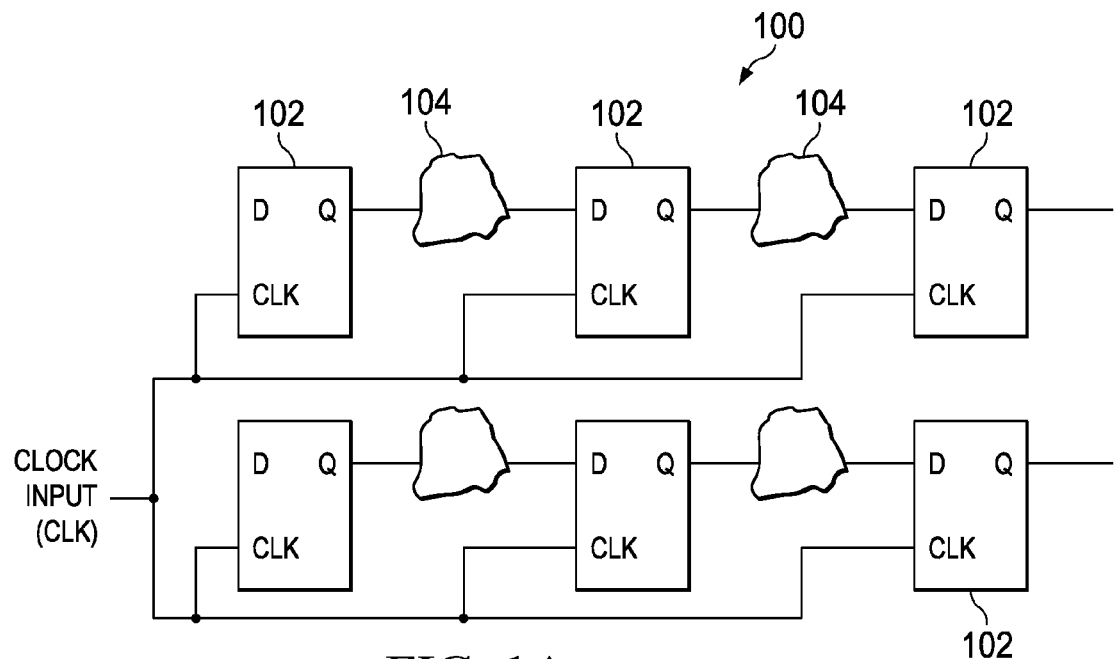
FIG. 1A illustrates a block diagram of IC data paths and FIG. 1B illustrates timeline diagrams of a corresponding clock input and current waveform according to an exemplary scenario.
Figure 1B:
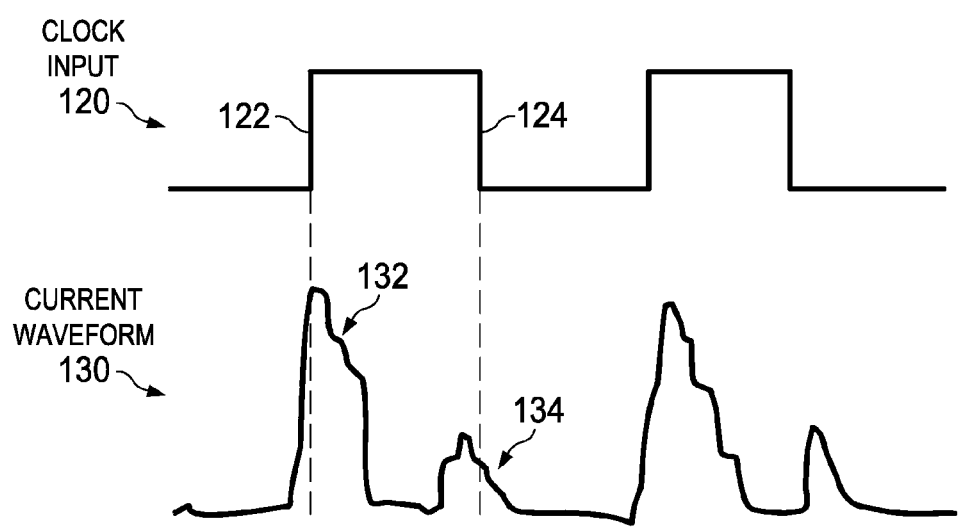

An explanation of this phenomenon will now be provided with reference to FIGS. 1A and 1B, which includes a block diagram of IC data paths 100 and timeline diagrams of a corresponding clock input 120 and current waveform 130. As depicted, a data path 100 includes a series of sequential elements, such as positive edge triggered flip-flops 102 and combination elements 104. As such, since the flip-flops 102 are positive edge triggered flip-flops and since toggling digital circuits typically involves discontinuing certain signals and/or commencing others, a notable majority of the power supply noise harmonics occur at the positive edge of the clock input 120. This harmonic disparity (also referred to herein as "odd harmonics") is illustrated by the current waveform 132 on the positive edges 122 of the clock input 120 being significantly greater than the current waveform 134 on negative edges 124 of the clock input 120.

A digital power profile corresponding to the clock input 120 in a data path such as the data path 100 may be represented as x(t), and the power at the positive and negative edges may be represented as $x_p(t)$, and $x_n(t)$, respectively. The power profile corresponding to the clock input 120 is represented by following expressions:

$$x_p(t) = \Sigma_{k=-\infty}^{k=+\infty} a_k \exp(jkw_0 t)$$

$$x_n = \Sigma_{k=-\infty}^{k=+\infty} (\lambda a_k \exp(-jkw_0 t_0)) \exp(jkw_0 t))$$

$$x(t) = x_p(t) + x_n(t) = \Sigma_{k=-\infty}^{k=+\infty} (a_k (1 + \lambda \exp(-jkw_0 t_0))) \exp(jkw_0 t))$$

Where $a_k$ is a Fourier coefficient and $w_0$ is $2*\pi/T_0$, where $T_0$ is the time period of the clock input. It is noted that the positive and negative edge powers are not equal such that the power in negative edges is scaled from that of positive edges by a factor $\lambda$. Fourier transform of the power profile is represented by the following expressions:

$$f(t_0)=1+\lambda\exp(-jkw_0t_0)$$

$$|f(t_0)|^2=(1+\lambda\cos(kw_0t_0))^2+(\lambda\sin(kw_0t_0))^2$$

From the above expression it is apparent that the odd harmonics, (e.g., for k=1, 3, 5 . . . ) will be present in the power profile. For example, for k=3, f(t$_0$)=1+λexp(−j3π) if t0=T0/2.

Accordingly, the present disclosure provides solutions for suppressing power supply noise harmonics in integrated circuits that overcome these and other limitations, in addition to providing currently unavailable benefits.

In one embodiment of the present disclosure, the odd harmonics of the power supply and/or ground network are suppressed by managing power such as by equalizing power on both the positive edges and the negative edges of the clock input. Hereinafter, power supply and/or ground network in combination is referred to as the power supply for the sake of brevity. Various embodiments of the present disclosure provide suppressing odd harmonics of the power supply irrespective of the topology of the IC. In certain embodiments of the present disclosure, half clock cycle delay is selectively introduced in data path for spreading power onto both positive and negative edges of the clock input and thereby causing odd harmonic suppression. For example, in a typical data path of the IC, based on the slack associated with the flip-flops, some flip-flops are selected and a corresponding output can be delayed by a threshold clock cycle.

Figure 2A:
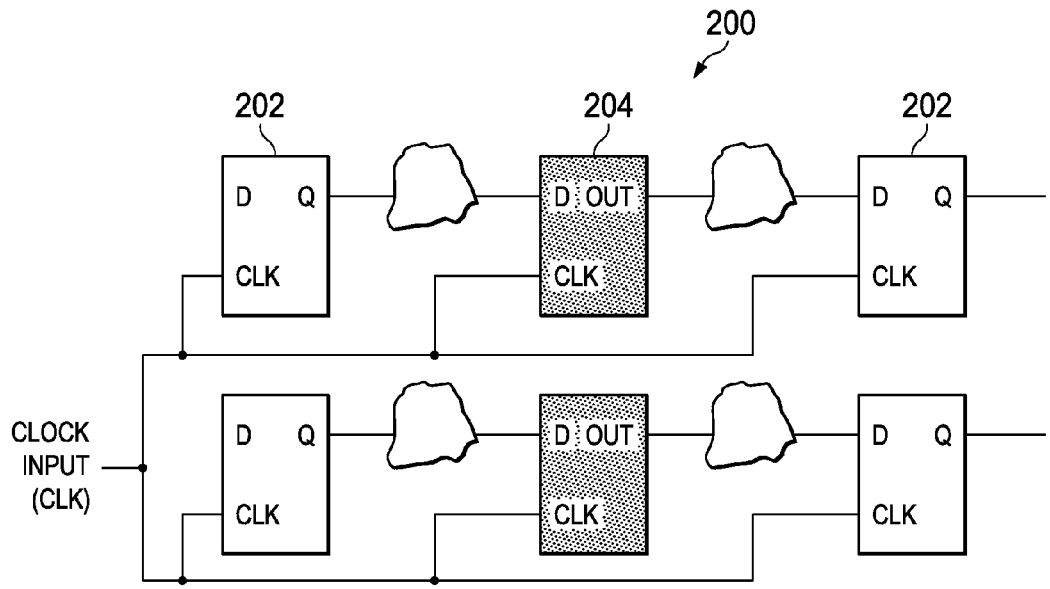
FIG. 2A illustrates block diagram of IC data paths and FIG. 2B illustrates timeline diagrams of a corresponding clock input and current waveform according to one embodiment.
Figure 2B:
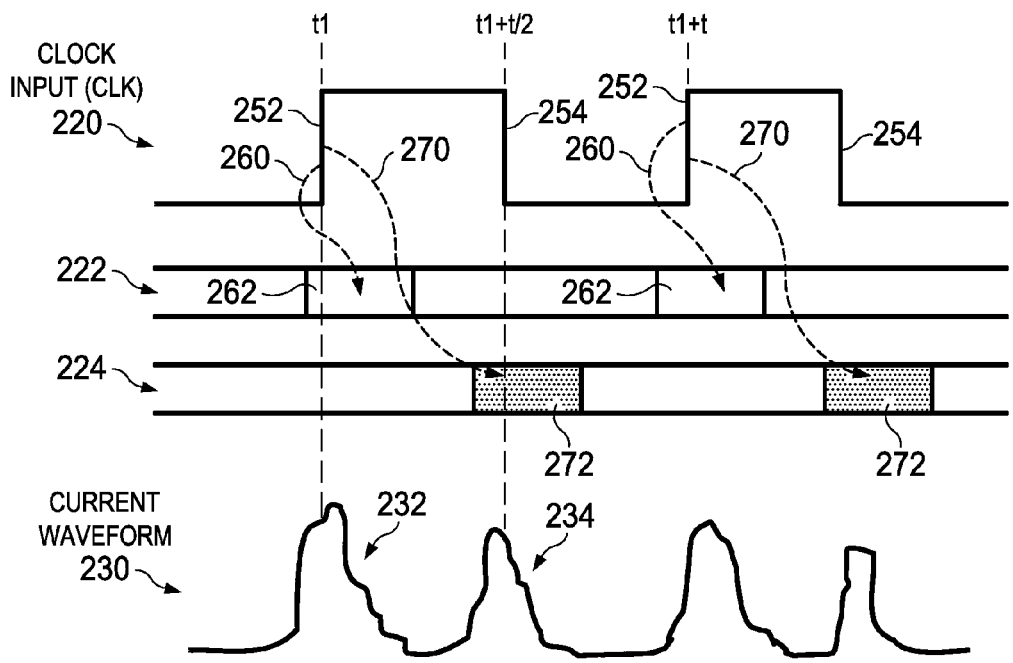

A data path 200 of an integrated circuit according to one embodiment of the present disclosure is shown in FIG. 2A. The data path 200 is shown to include two types of flip-flops. For example, the data path 200 includes flip-flops such as flip-flops 202 and flip-flops 204. It should be understood that the number of flip-flops in the data path 200 are presented for representation only and do not limit the scope of the present disclosure. The flip-flop 202 may be similar to the flip-flop 102 as described in FIG. 1A, and is either positive or negative edge triggered flip-flop. If the flip-flop 202 is a positive edge triggered flip-flop, the flip-flop 202 provides its output (Q) at positive edge 252 of the clock input (for example, CLK 220). A toggling pattern 222 of the flip-flop 202 is also shown in FIG. 2B. As shown in toggling pattern 222, the flip-flops 202 toggles with the positive edge 252 of the CLK 220. As depicted by arrow 260, the flip-flop 202 toggles (represented by reference numeral 262) on the positive edge 252 of the CLK 220.

In one embodiment, the flip-flop 204 is configured to delay output by a threshold clock cycle. In one embodiment, the flip-flop 204 includes a flip-flop such as the flip-flop 202 and a delay circuit (not shown) coupled to the output of the flip-flop 202 that can delay the output of the flip-flop 202 by the threshold clock cycle. In one embodiment, the threshold clock cycle is equal to a half clock cycle. A clock cycle is of a time period 'V', and the half clock cycle is a cycle between 't' and 't1+t/2' or between 't1+t2' to 't1+t', as shown in FIG. 2B. In this embodiment, the flip-flop 204 appears to be toggling at negative edge 254 of the CLK 220 due to the extra half clock cycle delay generated by the delay circuit. As depicted by arrow 270, the flip-flop 204 appears to toggle (represented by reference numeral 272) on the negative edge 254 of the CLK 220. The configuration of the flip-flop 204 is further provided in FIGS. 3A and 3B. For an example representation, a toggling pattern 224 of the flip-flop 204 is also shown in FIG. 2B. As evident from the toggling pattern 224, the flip-flop 204 toggles with the negative edge 254 of the CLK 220.

A current waveform 230 associated with the data path 200 of the IC is also represented in FIG. 2B. It should be noted that the current waveform 230 at the negative edges 254 of the CLK 220 are substantially equal to the current waveform 230 at the positive edge 252 of the CLK 220. For example, wave peak 232 at the positive edge 252 of the CLK 220 and wave peak 234 at the negative edge 254 of the CLK 220 are substantially equal.

Figure 3A:
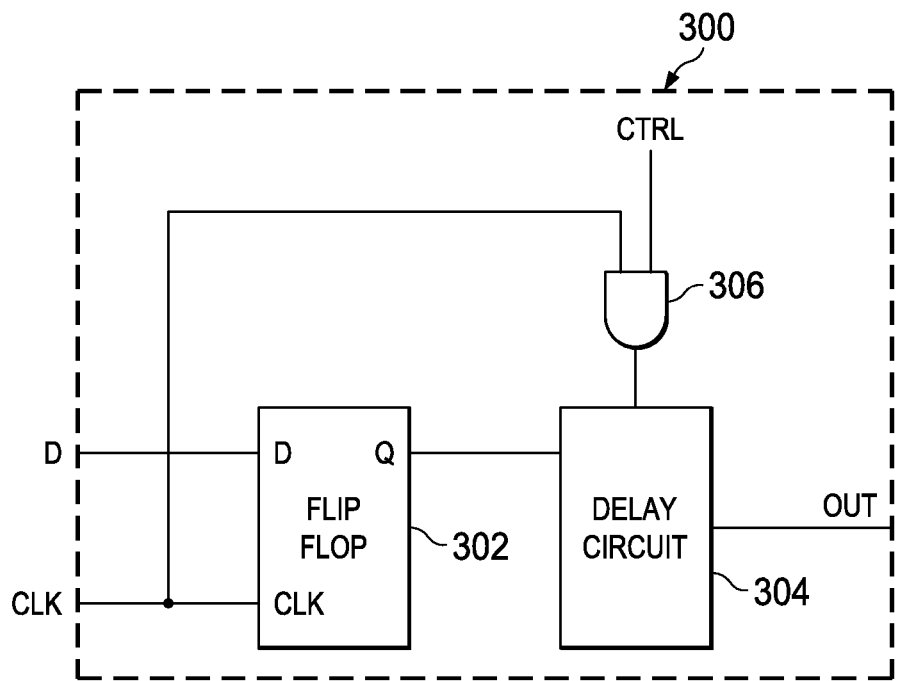
FIGS. 3A and 3B illustrate configurations of a flip-flop having delay circuit that are utilized in the integrated circuit for suppressing power supply noise harmonics according to one embodiment.
Figure 3B:
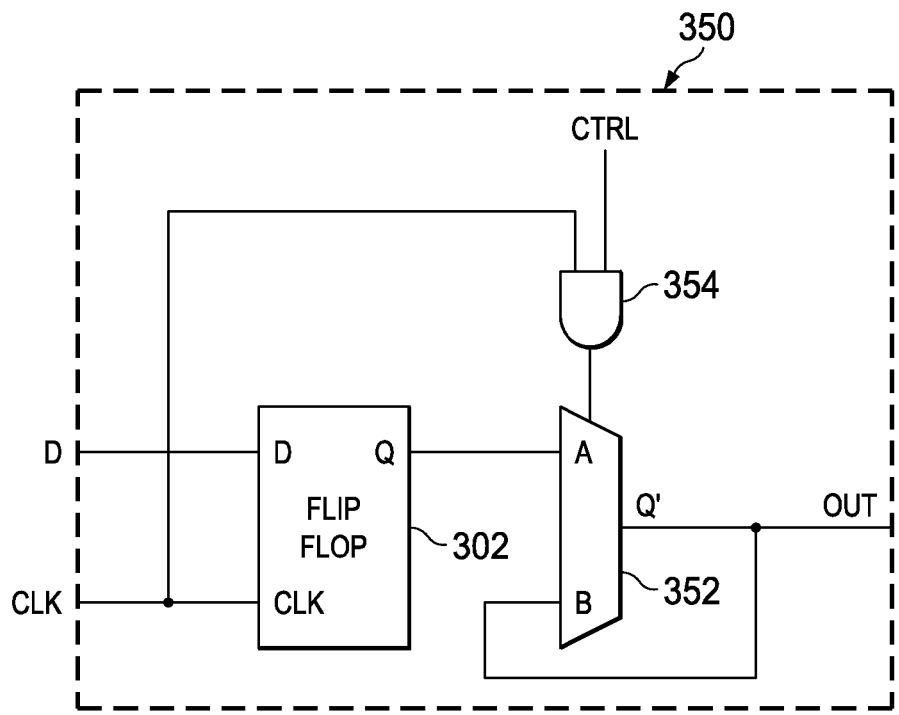

Referring now to FIGS. 3A and 3B, example configurations 300 and 350 of the flip-flop 204 are shown, in accordance with certain embodiments of the present disclosure. As shown in FIG. 3A, the flip-flop 300 includes a flip-flop 302 and a delay circuit 304 coupled to the output (Q) of the flip-flop 302. In an embodiment, the flip-flop 302 is be a D flip-flop similar to the flip-flop 202 as described in FIG. 2A. The delay circuit 304 is configured to introduce a delay of the threshold clock cycle to the output of the flip-flop 302. In an embodiment, the delay circuit may be implemented by a sequential block such as a D flip-flop. In an example embodiment, the threshold clock cycle may be a half clock cycle, causing the output (OUT) of the flip-flop 204 to switch at the negative edge of the CLK. In certain embodiments, the delay circuit 304 may be controlled by adding suitable control circuit such as an AND gate 306 having one input as a control pin (shown as 'CTRL' in FIG. 3A), and other input as CLK.

FIG. 3B depicts a flip-flop 350, which is another example of the flip-flop 204. The flip-flop 350 includes the flip-flop 302 and a delay circuit 352 coupled to the output (Q) of the flip-flop 302. In this embodiment, the delay circuit 352 is a multiplexer element. The multiplexer element has two inputs A and B. The input A is connected to the output (Q) of the flip-flop 302, and the output Q' of the multiplexer element (of the delay circuit 352) is feedback to the input B of the multiplexer element. In certain embodiments, the function of the delay circuit 352 (i.e., the multiplexer element) is enabled/disabled by using a control circuit such as an AND gate 354 in control input of the multiplexer element. It will be apparent to those ordinarily skilled in the art that other logic gates including but not limited to, NAND or NOR gates may also be used for the control circuit.

Certain embodiments of the present disclosure utilize delay circuits such as the delay circuit 304 or 352 at the output of the flip-flop 302 to delay the output of the flip-flop 302 by half clock cycle. Such delay causes toggling of nodes associated with the flip-flops to the other edge of the clock and, therefore, spread dynamic power from one edge to other edge of the clock. Accordingly, in data paths with interfering, odd harmonics, the foregoing flip-flops and delay circuits may be used to selectively suppress certain harmonics.

A digital power profile corresponding to the clock input 120 in a data path such as the data path 100 may be represented as x(t), and the power at the positive and negative edges may be represented as $x_p(t)$, and $x_n(t)$, respectively. The power profile corresponding to the clock input 220 is represented by following expressions:

$$x_p(t)=\Sigma_{k=-\infty}^{k=+\infty}a_k\exp(jkw_0t)$$

$$x_n(t)=\Sigma_{k=-\infty}^{k=+\infty}a_k\exp(-jkw_0t_0))\exp(jkw_0t)$$

$$x(t)=x_p(t)+x_n(t)=\Sigma_{k=-\infty}^{k=+\infty}(a_k(1+\exp(-jkw_0t_0)))\exp(jkw_0t))$$

Fourier transform of the power profile is represented by the following expressions:

$$f(k)=1+\exp(-jkw_0t_0)$$

$$f(k)=1+\exp(-jk\pi) \text{ since } t_0=T_0/2$$

for k=1,3,5, . . . f(k)=0

From the above expression it is apparent that the odd harmonics, (e.g., for k=1, 3, 5 . . . ), f(k)='0'. It should be noted that the with the toggling of the flip-flops at both the positive and negative edges of the clock input (i.e., equalizing the power profile on both edges of the clock input), the odd harmonics of the power supply are cancelled/suppressed.

Figure 4A:
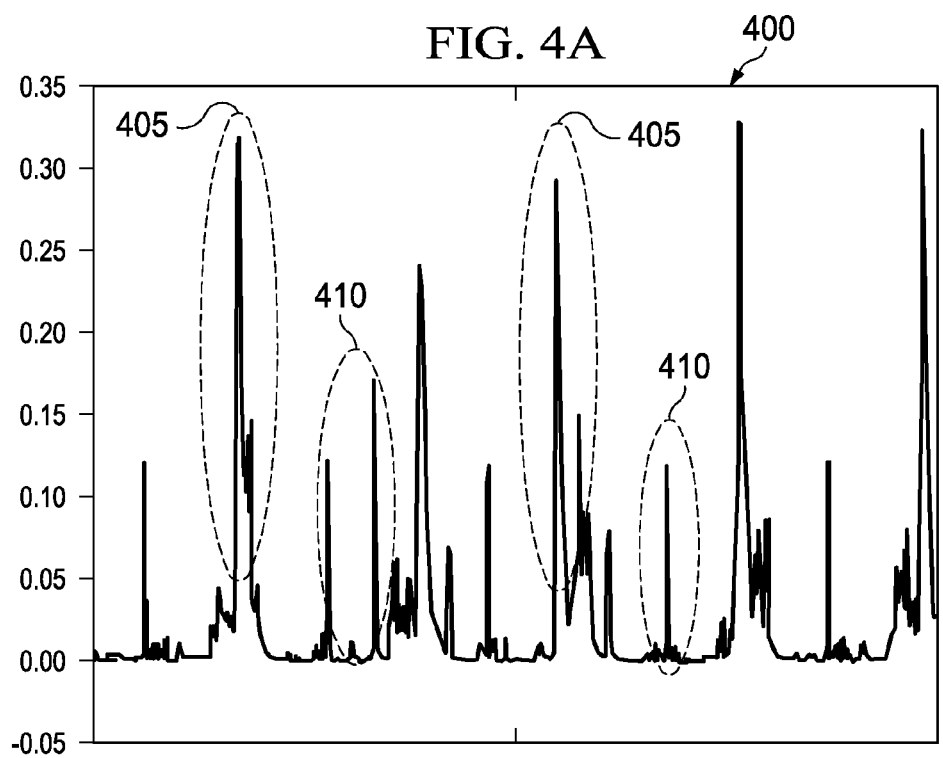
FIG. 4A illustrates a current waveform associated with a normal data path and FIG. 4B illustrates a current waveform associated with a data path utilizing some embodiments.
Figure 4B:
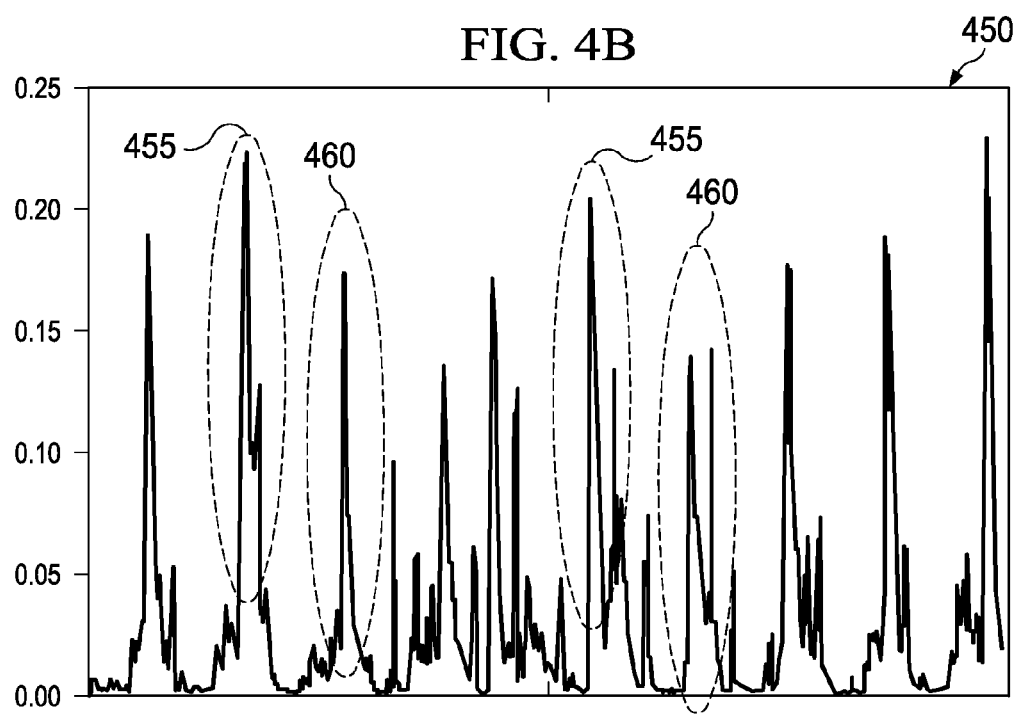

The effect on the overall current in a particular data path utilizing the present disclosure is provided with the help of comparison with overall current in a normal data path that does not utilize the concept of delay circuit in a corresponding data path as disclosed in the present disclosure, in FIGS. 4A and 4B.

FIGS. 4A and 4B includes current waveform tables illustrating current waveforms for distinct IC data paths. As shown in FIG. 4A, a current waveform 400 includes wave peaks 405 (~0.325) that are much greater than subsequent wave peaks 410 (~0.140). As such, the current waveform 400 is consistent with the IC data paths discussed above with respect to FIG. 1A. In an example, the wave peaks 405 represent current in the IC data path at positive edges of clock input to the IC data path; whereas the wave peaks 410 represent current in the IC data path at negative edge of the clock input to the IC data path. That is, the significant difference between the wave peaks 405 and 410 is indicative of IC data paths without the delay circuits 304, flip-flops 350, and other components of the present disclosure, resulting in mixed signal IC that is prone to signalling interference from power source noise harmonics.

By contrast, the current waveform 450 (see, FIG. 4B) includes a first set of wave peaks 455 (~0.250) at the positive edge of a clock input (CLK) 220 that is similar to a subsequent set of wave peaks 460 (~0.180,) at the negative edge of the clock input 120. The similarities between the wave peaks 455 and 460 are indicative of IC data paths that incorporate delay circuits 304, flip-flops 302, and other components of the present disclosure. As such, unlike the odd harmonics of current waveform 400, the current waveform 450 provides a relatively predictable and evenly-distributed set of wave peaks 455 and 460 that is conducive to the reliable mixed-signal ICs.

The flowchart diagrams that follow are generally set forth as logical flowchart diagrams. The depicted operations and sequences thereof are indicative of at least one embodiment of the present disclosure. It should be appreciated, however, that the scope of the present disclosure includes methods that use other operations and sequences, and methods that are useful or similar in function, logic, or effect. Also, while various arrow types, line types, and formatting styles may be employed in the flowchart diagrams, they are understood not to limit the scope of the corresponding method(s). In addition, some arrows, connectors and other formatting features may be used to indicate the logical flow of the methods. For instance, some arrows or connectors may indicate a waiting or monitoring period of an unspecified duration. Accordingly, the specifically disclosed operations, sequences, and formats are provided to explain the logical flow of the methods and are understood not to limit the scope of the present disclosure.

Figure 5:
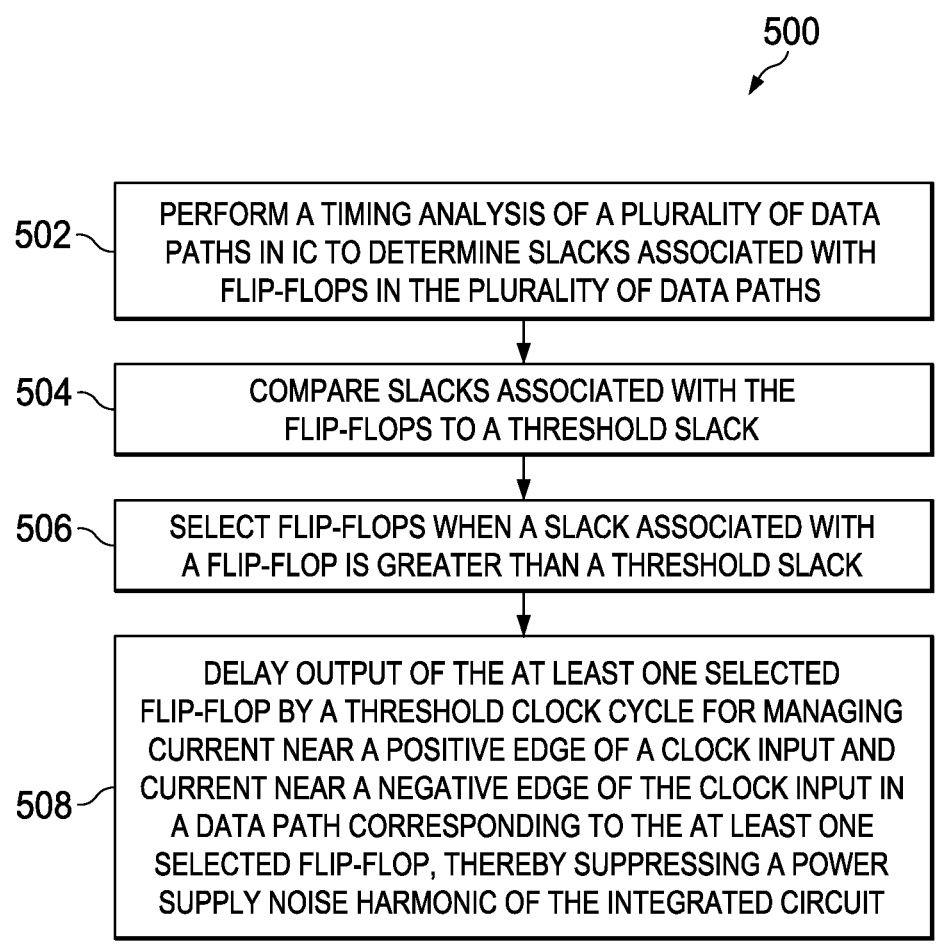
FIG. 5 is a process flow for designing an integrated circuit capable of suppressing power supply noise harmonics according to one embodiment.

FIG. 5 is a flow chart diagram of a method 500 for designing an IC in accordance with one or more embodiments of the present disclosure. The method 500 includes selecting at least one flip-flop of a plurality of data paths on the IC, and delaying an output of at least one selected flip-flop by a threshold clock cycle for managing current near a positive edge of a clock input and current near a negative edge of the clock input in a data path corresponding to the at least one selected flip-flop, thereby suppressing a power supply noise harmonic of the integrated circuit.

In an embodiment, the method 500 includes performing 502 a timing analysis of a plurality of data paths in the IC. In an embodiment, a timing analysis of the plurality of IC data paths may be performed 502 to determine one or more slacks associated with flip-flops in the IC data paths. In an example, one or more slacks associated with a typical flip-flop may include slacks at different nodes of the flip-flop, such as at input pin of the flip-flop or at output pin of the flip-flop. Without limiting to the scope of the present invention, slack, at a particular node, may indicate a time delay difference from an expected arrival time for a signal such as data, to an actual arrival time for the signal at the node of the flip-flop.

The timing analysis may be performed by any suitable Static Timing Analysis (STA) tools such as, Altos Design Automation™ tool, TimeMill®, PrimeTime® and MOTIVE® (all registered trademarks of Synopsys®), Ambit™ from Cadence® and Velocity and Leonardo Spectrum™ by Mentor Graphics®, and Dynamic Timing Analysis (DTA) tools such as Modelsim™ from mentor Graphics®, VCS™ from Synopsys®, and the like.

In an embodiment, the method 500 includes comparing 504 a slack of the one or more slacks associated with each of the flip-flops to a threshold slack. In one embodiment, the threshold slack may be equal to the half clock cycle of the input clock signal to the IC. However, the threshold slack may be equal to other fraction of the clock cycle of the input clock signal, In one embodiment, the method 500 includes selecting 506 flip-flops based on the comparison of slacks associated with the flip-flops with the threshold slack. In one embodiment, the flip-flops for which the associated slacks are greater than the threshold slack are selected. In a typical IC, there may be significant number of flip-flops for which the slacks may be more than the threshold slack.

An example of a slack profile for IC data paths in a typical IC is tabulated in TABLE 1, where the operating clock frequency is assumed as 40 MHz. Table 1 includes a number of flip-flops for a respective slack range in the IC data paths for the operating clock frequency of 40 MHz. The number of flip-flops for a particular slack range is tabulated for slacks associated with flip-flops at input pins as well as output pins of the flip-flops.

TABLE 1

| Slack (picoseconds) | Number of flip-flops having slack at end point (at input pin of the flip-flops) | Number of flip-flops having slack at start point (at output pin of the flip-flops) |
| --- | --- | --- |
| 0-3000 | 2917 | 2453 |
| 3000-6000 | 8600 | 586 |
| 6000-9000 | 1672 | 1502 |
| 9000-12000 | 1522 | 1126 |
| 12000-15000 | 10998 | 2725 |
| 15000-18000 | 13595 | 7276 |
| 18000-21000 | 6765 | 36720 |
| 21000-24000 | 5315 | 40564 |
| >24000 | 52125 | 10652 |

In an example, the threshold slack may be considered as 21000 picoseconds for an operating clock frequency of 40 MHz for the IC data paths provided in Table 1, Accordingly, the flip-flops which have slacks at the output pins of the flip-flops greater than 21000 ps may be selected. In the example of Table 1, total number of flip-flops having associated slack more than 21000 picoseconds at the output of the flip-flops (start points) is a sum of 40564 and 10652, and accordingly, these flip-flops may be selected. It should also be understood that the flip-flops may also be selected based on the slacks at the input pins of the flip-flops.

The method 500 further includes delaying 508 the output of the selected flip flops by a threshold clock cycle. As explained in conjunction with FIGS. 2A-4B, delaying the output of at least one selected flip-flop by the threshold clock cycle causes managing current near the positive edge of a clock input and current near the negative edge of the clock. The currents near the positive edge and the negative edge are managed such that both currents are substantially equal in a data path corresponding to the at least one selected flip-flop, which in turn, causes suppressing the power supply noise harmonic of the IC, In an embodiment, delaying 508 the output of the selected flip-flops by the threshold clock cycle includes providing the delay circuits such as the delay circuit 304 at the output of the selected flip-flops. In one embodiment, by providing the delay circuits at the output of a selected flip-flop, the toggling pattern of the selected flip-flop is delayed by the threshold clock cycle. Accordingly, in one embodiment, in a typical data path in the IC, some flip-flops toggles at the positive edge of the clock input, whereas the selected flip-flops provided with the delay circuits toggle at the negative edge of the clock input. Such toggling pattern of the flip-flops in the data path can cause substantially equal current at positive edge of the clock input and at negative edge of the clock input in the data path. Accordingly, by creating extra delay in data path, dynamic power can be spread onto both positive and negative edges of the clock input. Such substantial equalization of power on both edges of clock input, peak power at any given instant is reduced, and accordingly, odd harmonics can be suppressed in the data paths of the IC.

In some embodiments, the method 500 may also include providing a control circuit such as the AND gate 354. The control circuit may be configured to enable or disable the delay circuits provided at the outputs of the selected flip-flops.

Embodiments of the present disclosure include one or more computer programs stored or otherwise embodied on a computer-readable medium, the computer programs being configured to control a processor to perform one or more operations. A computer-readable medium storing, embodying, or encoded with a computer program, or similar language, may be embodied as a tangible data storage device storing one or more software programs that are configured to control a processor to perform one or more operations. Said operations may be, for example, any of the steps or operations described herein. Additionally, a tangible data storage device may be embodied as one or more volatile memory devices, one or more nonvolatile memory devices, and/or a combination of one or more volatile memory devices and nonvolatile memory devices.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

The invention claimed is:

1. An integrated circuit, comprising:
    data paths, each data path including at least two flip-flops coupled to receive a same clock signal;
    a delay circuit coupled to an output of one of the at least two flip-flops, the delay circuit delaying an output of the flip-flop by a partial clock cycle for equalizing current near a positive edge and a negative edge of the clock signal; and
    a control circuit connected to the delay circuit, the control circuit enabling and disabling the delay circuit at the output of the flip-flop coupled to the delay circuit.

2. The integrated circuit of claim 1, in which the partial clock cycle is a half clock cycle.

3. The integrated circuit of claim 1, in which an expected arrival time for a signal at the output of a flip-flop to which the delayed circuit is coupled is greater than a reference time.

4. The integrated circuit of claim 1, in which the delay circuit includes a sequential block.

5. The integrated circuit of claim 1, in which the delay circuit is implemented by a multiplexer element.

6. The integrated circuit of claim 1, in which the flip-flop coupled to the delay circuit is toggled on a negative edge of the clock signal and the other flip-flop is toggled on a positive edge of the clock signal.

7. The integrated circuit of claim 1, in which the delay is a partial clock cycle.

* * * * *